INVENTORS
DONALD J. ROTIER
RUSSELL C. HENDRICK
BY

*Gordon Reed*
ATTORNEY

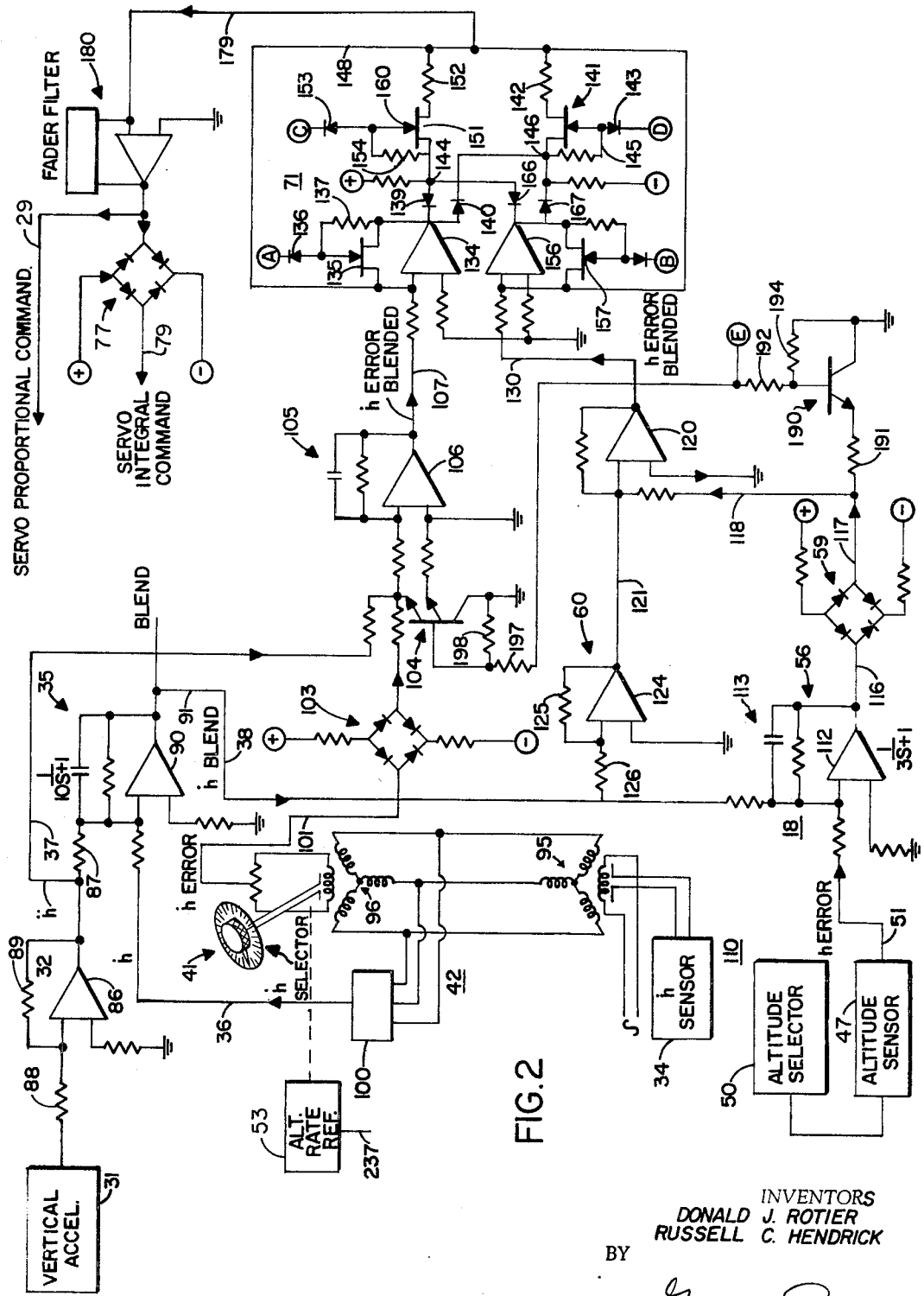

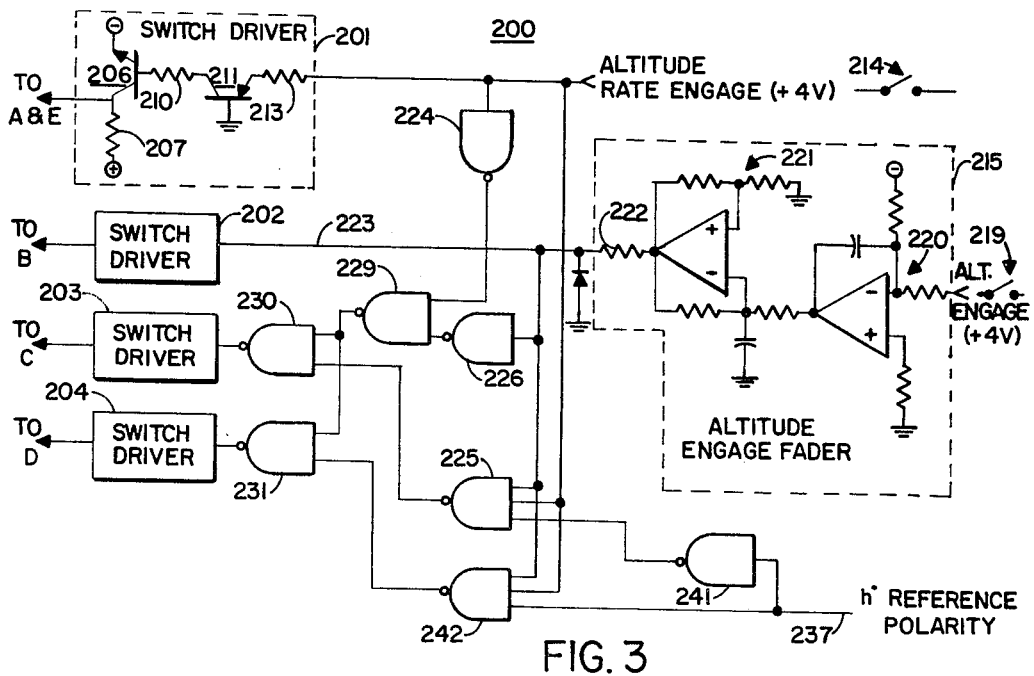

United States Patent Office 3,510,092
Patented May 5, 1970

3,510,092
CRAFT ALTITUDE CONTROL APPARATUS
Russell C. Hendrick, Fridley, and Donald J. Rotier, St. Paul, Minn., assignors to Honeywell Inc., Minneapolis, Minn., a corporation of Delaware
Filed July 28, 1967, Ser. No. 656,776
Int. Cl. B64c *13/18;* G05b *1/01*
U.S. Cl. 244—77                15 Claims

ABSTRACT OF THE DISCLOSURE

The disclosure relates to condition control apparatus such as aircraft control apparatus and primarily for outer loop altitude control of the aircraft about its pitch axis wherein two forms of outer loop control are provided (a) altitude rate hold, select and adjust, and (b) altitude hold, select and adjust. In (a) there will be maintained the altitude rate existing at the time of its engagement unless a different altitude rate has been selected prior to its engagement; in this case, it will maneuver the craft to the selected rate. It can also be used in conjunction with the altitude control mode to establish the rate of climb or descent desired by the pilot when accomplishing a selected altitude change. The system is designed to limit the vertical acceleration to 0.1 g. during select and adjust operations and when engaged at an existing altitude rate.

In (b) the aircraft altitude will be maintained at the altitude existing at the time of its engagement unless a different altitude has been selected prior to its engagement; in this case, it will maneuver the aircraft to the selected altitude. The altitude mode can be used simultaneously with the altitude rate mode to permit selection of the maximum altitude rate desired during a climb or descent to a selected altitude. If both modes (altitude rate and altitude hold) are engaged simultaneously, a signal selector is activated. This signal selector selects (from the rate error and altitude error) the signal calling for the more down-elevon signal or the one calling for the more down depression of the nose of the craft if the selected rate is a climb signal. However, the more up-elevon signal or greater nose up signal is selected to control the surfaces of the craft if the selected rate calls for a descent.

This implementation results in a smooth transition between control modes as the altitude rate error and altitude error signals become equal.

---

This invention thus relates to condition control apparatus such as apparatus for controlling to an outer loop mode an aircraft about its pitch axis to provide for changes in position of the craft. In the present instance, such changes in position relate to the altitude of the craft. The changes in altitude of the craft may be accomplished through selected rates of change of altitude.

An object of the invention is to provide improved means for effecting a preselected change in altitude at a selected rate of change of altitude.

A further object of the invention is to provide improved means in reducing the tendency to overshoot a preselected altitude when making the change in altitude at a preselected rate from one altitude to the selected altitude.

A further object of this invention is to provide condition control apparatus for displacing the condition to be stabilized by the apparatus and effecting such displacement in the condition at a desired rate of change of displacement in the condition and as the condition is being displaced, comparing the signal corresponding with the remaining displacement to be effected with the variation in the rate of change in the displacement and selecting one of such two signals for control of the apparatus, such selected signal having the more effect opposing further displacement of the craft.

A further object of the invention is to provide improved apparatus for changing the altitude of an aircraft a preselected amount and to reduce the tendency of the craft to overshoot the desired preselected altitude.

A further object of this invention is to provide an improved altitude control apparatus for changing the altitude thereof in preselected amounts at a preselected rate of change of altitude and comparing the altitude error and the altitude rate error and alternatively selecting one of the two signals to reduce the tendency of the craft to overshoot the desired altitude.

A further object of this invention is to provide improved altitude control apparatus for effecting a preselected change in altitude at a selected altitude rate and comparing the altitude error and altitude rate error and fading the control from the altitude rate error as the preselected altitude is attained.

The above and other features and structural details of the invention will be apparent from the following description when read in conjunction with the accompanying drawings, wherein:

FIG. 2 is an electrical schematic of the signal portion of the control apparatus;

FIG. 3 is a block diagram of the logic arrangement for controlling the signal selector of FIG. 2.

FIG. 4 is a tabulation of the operation of FIG. 2 for various configurations of switches and selectors.

Figure 1:
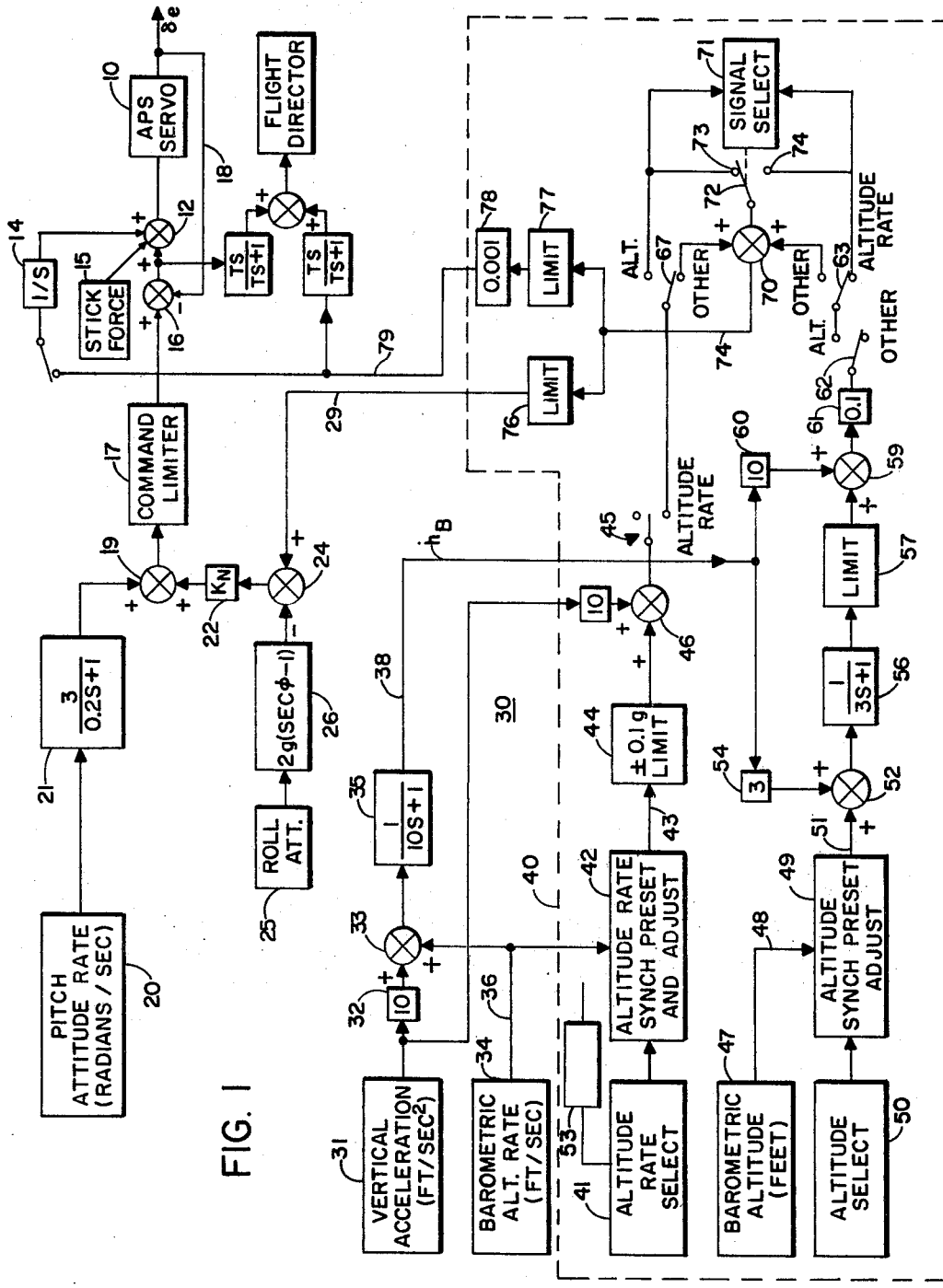
FIG. 1 is a block diagram of the altitude control apparatus embodying novel means for selecting from a plurality of signals a primary control signal.

In FIG. 1 a servo means 10 operates a condition changing means such as an elevator or elevon of an aircraft to control its attitude about its pitch axis. The servo means 10 may be of the fluid or hydraulic type and receives from an outer loop control section input control signals from a summing arrangement 12. Such signals conventionally may be AC or DC electrical signals. One control signal to summing device 12 is obtained from an integrator 14; a second signal is supplied from a stick force signal generator 15 and a third signal is supplied from a second summing device 16 with the methematical signs as indicated.

Summing device 16 receives a signal from a command signal limiter 17 and a servo means displacement feedback signal over conductor 18.

The command limiter 17 receives control signals from a signal summing arrangement 19 which has supplied thereto a pitch rate signal derived from a rate sensing means 200 having its output supplied through a lag device 21 to summing arrangement 19. A second input to arrangement 19 is supplied through a gain device 22 which receives the output of a fourth signal summing arrangement 24. Applied to summing arrangement 24 is a roll attitude signal from sensor 25 that operates a signal generator 26 to supply a signal compensating for decrease in lift during bank changes in the craft. Other signals are supplied over conductor 29 to the summing arrangement 24 such signals being derived from a signal arrangement 30. Signal arrangement 30 includes a sensor 31 sensing vertical acceleration of the aircraft which supplies a signal through a gain device 32 to a signal summing device 33. A barometric altitude rate sensor 34 also supplies through transmitting means 36 a signal to summing arrangement 33. Signal summer 33 has its output supplied to a lag device 45 so that the output on conductor 38 is in accordance with a blended altitude rate quantity having high and low frequency components.

The primary novel features of the invention are more directly involved in the apparatus outlined by dashed line 40. This apparatus includes a manually operated altitude rate selector 41 supplying its control setting to an altitude rate synch. preset and adjust arrangement 42 which also receives an input operation from the barometric altitude rate source 34. The arrangement is such that an altitude rate error appears on conductor 43 in accordance with the difference between the manually selected altitude rate and the barometric altitude rate sensed. The altitude rate error is supplied through a limiter 44 to a summing device 46. The output from summing device 46 appears on conducting means or switching means 45. Also operated by rate selector 41 is an altitude rate reference 53 supplying a signal according to the direction of altitude rate commanded, positive for escent, negative for descent.

There is also provided a barometric altitude sensor 47 supplying its output signal over conductor 48 to an altitude synch. preset and adjust device 49 which also receives a control signal from an altitude select device 50. The arrangement is such that an altitude error appears on transmitting means 51 in accordance with the difference between the sensed barometric altitude from sensor 47 and the altitude selected from selector 50. The signal on transmitting means 51 is supplied to a summing device 52 which also receives the blended altitude rate signal on conductor 38 through a gain device 54. The output of summing device 52 is supplied through a lag device 56, a limiter 57 to a summing device 59. The summing device 59 also receives the blended altitude rate signal on transmitting means 38 through a gain device 60. The output of summing device 59 is supplied through the gain device 61 to a switch arm 62.

It will be apparent from FIG. 1 that with the switch arm 62 in its upper position, identified ALT, and a switch 63 in its lower position, identified altitude rate, that the altitude error signal is supplied to a signal selector 71. Also, with switch arm 45 in its lower position identified Alt. Rate and another switch arm 67 in its upper position that the altitude rate error signal is supplied to the signal selector 71. The novel signal selector 71 automatically operates a switch arm 72 to engage alternatively a contact 73 or a contact 74 so that either the altitude error signal or the altitude rate error signal is supplied from contacts 73 or 74, contactor 72, summing device 70, conductor 74 through a limiter 76 and conductor 29 to summing the device 24 and through limiter 77, gain device 78 and conductor 79 to the signal integrator 14.

Thus, by operating switching arm 72 from the signal selector 71 either proportional and integral control from the rate error signal on arm 67 is provided servo 10 or proportional and integral control from the altitude error signal on arm 63 is supplied to servo means 10. The essence of the invention is in controlling the operating servo 10 for the control surface alternatively by one or the other of the two control signals.

For details of the signal selector 71 reference is made to FIG. 2 showing an electrical schematic thereof along with details of an electrical form of control apparatus for supplying control signals.

In FIG. 2, the vertical accelerometer 31 supplies a signal acocrding to sensed vertical acceleration of the craft to a gain device 32 consisting of an amplifier 86, input resistor 88, and a feedback resistor 89 whereby the output of the gain device 32 is equal to the product of the sensed acceleration signal and the ratio of the feedback resistor 89 to the input resistor 88. The output signal on conductor 87 is supplied to a lag device 35 similar to gain device 32 but including a feedback network combining a resistance and capacitance in parallel. The amplifier 90 of the lag network 35 typically is designed to draw zero current. It is to be understood that while the control signals in FIG. 2 are initially AC, they are demodulated prior to their application to amplifier such as 86, 90, and others to be mentioned.

The lag network 35 also receives a second control signal over conductor 36 that is applied to amplifier 90 such signal being a sensed altitude rate signal. This rate signal is supplied from a barometric altitude rate sensor 34 through a conventional control transformer 100. The altitude rate sensor 34 and an altitude rate selector 41 jointly supply an altitude rate error signal while the sensor 34 may also supply an altitude rate reference signal. For the above two purposes, the altitude rate sensor 34 operates a synchro 95 having its rotor winding positioned by the altitude rate sensor 34 which winding is energized from an alternating current source. The synchro includes a stator having three windings which are connected conventionally to the stator windings of a second synchro 96. The second synchro includes a rotor winding manually positionable by an altitude rate selector 41. The winding of the second synchro 96 has a voltage generated therein in accordance with the difference between the altitude rate sensed and the altitude rate selected by selector 41.

The voltage across the stator windings of synchro 95 is also supplied through a third synchro or control transformer 100 having its output supplied by conductor 36 to amplifier 90 of lag device 35. The signal on conductor 36 is the barometric altitude rate as sensed.

The output of the lag device 35 is termed a blended altitude rate since it is composed of the high frequency acceleration component and the sensed barometric rate low frequency component.

The vertical acceleration signal on conductor 37 is also supplied to a dual emitter transistor 104, and this transistor also receives the altitude rate error from synchro 96 through conductor 101 and a conventional limiter 103. The output from the transistor 104 is supplied to a lag device 105 having a transfer function $1/(10s+1)$, where $s$ is the conventional LaPlace operator. Lag network 105 conventionally consists of an amplifier 106 and a feedback path consisting of a capacitor and resistor in parallel. Thus the output of the lag network 105 is the altitude rate error, blended and by transmitting means 107 it is supplied to the signal selector device 71.

FIG. 2 also includes an altitude error providing device 110 including an altitude sensor 46 and an altitude selector 50. The altitude error signal device 110 as to its electrical components may be similar to the altitude rate error providing device 42. Such arrangements for providing an electrical signal according to the error between a sensed quantity and a selected quantity are old in the patent to Kellogg, 2,613,350, see FIG. 1 synchros 17 and 18.

The altitude error $h$ is transmitted from the arrangement 110 by conductor 51 to lag device 56 having the transfer function $1/3s+1$). Lag device 56 consists conventionally of an amplifier 112 and a feedback network 113 consisting of a resistor and capacitor in parallel. The lag device 56 also receives from its parallel summing network 18 a second input from conductor 38 in accordance with the blended altitude rate of the craft. The output of lag network 56 is a blended altitude error signal that is supplied through conductor 116 to a limiter 59 having in turn its output supplied and in one instance via conductor 117 and subconductor 118 to proportional amplifier 120. Amplifier 120 also receives a second input through the conductor 121 from proportional gain, inverting device 60. Device 60 comprises an amplifier 124, a feedback resistor 125, and an input resistor 126 which has one end thereof connected to the conductor 38 that supplies the blended altitude rate signal. The input of amplifier 120 is blended altitude error and blended altitude rate and its output is a blended altitude error signal that is supplied to output conductor 130. Thus in one case by means of conductor 107 the blended altitude rate error, and in another case by means of a conductor 130, the blended altitude rate and the blended altitude errors are supplied to the signal select switching arrangement 71.

The signal select switching arrangement 71 comprises two high gain amplifiers 134, 156, four field effect transistors, 135, 141, 151, 157, eight diodes, and associated resistors. Amplifier 134 has connected between its output and input terminals one field effect transistor 135. The control electrode of this transistor is connected through a diode 136 to a field effects transistor conduction control terminal A for a purpose to be described, terminal A is selectively energized. Between the control electrode and the diode one end of a shunting resistor 137 is connected, with its opposite end connected to the output terminal of amplifier 134. Extending in forward conducting relation from the output of amplifier 134 is a first diode 140 connected in series with a field effect transistor 141 and a resistor 142 with the remote end of resistor 142 connected through a feedback path 148 to the input side of amplifier 134. A control electrode of transistor 141 is connected through a diode 143 to a terminal D. A resistor 145 connects the junction between the electrode and diode 143 to the junction between forward conducting diode 140 and transistor 141.

Also connected in series from the output of amplifier 134 to the amplifier feedback conductor 148 is a diode 139 connected in reversely conducting relation from that of diode 140, a field effect transistor 151, and resistor 152 extending to the feedback conductor 148. Transistor 151 includes a control electrode which is connected through a diode 153 to a conduction control terminal C. A resistor 154 extends or is connected between the junction of diode 153 and the transistor control electrode and the junction between diode 139 and transistor 151. To this junction between diode 139 and transistor 151 is also supplied $a+DC$ voltage. A similar arrangement is provided for the second amplifier 156 with one field effect transistor 157 having its control electrode connected through a diode to a source of voltage B for conduction control. Associated with amplifier 156 is one diode 166 connected in reverse conduction arrangement to the 15 volt DC positive source and a second diode 167 connected in forward conduction relationship to a −15 volt DC source.

The output of the signal selecting switching device 71 is transmitted by conductor 179 to a fader filter 180, and the output from the filter is supplied in one instance over conductor 181 to supply a proportional command to the servo means 10. The output from the filter 180 is also supplied through a limiter 185 to the servo means 10 integral command.

Included in FIG. 2 at the bottom and to the right of center is a NPN transistor 190 having its emitter connected by resistor 191 to output conductor 117 of limiter 59. A control electrode of transistor 190 is connected through a resistor 192 to a selectively positive voltage source E for conduction control of the transistor 190. A resistor 194 is connected between the control electrode and the collector which is connected to signal ground.

In addition, the voltage source E is connected through a resistor 197 to the control electrode of transistor 104. A resistor 198 is connected between the junction of the control electrode of transistor 104 and resistor 197 and the emitter of the transistor which latter is connected to signal ground.

Reference was made during the description of the selector 71 in FIG. 2 to terminals A, B, C, D, and E. These points are associated with and their energization is controlled by the logic arrangement 200 of FIG. 3 for preconditioning or presetting the signal select switching arrangement 71 in FIG. 2 for alternative selection of the outputs of amplifiers 134, 156 for control of servo means 10.

The explanation of the relationship of the logic 200 and switching arrangement 71 will be hereinafter clarified with respect to the table in FIG. 4.

In FIG. 3, the logic circuit 200 comprises four switch drivers 201, 202, 203, and 204. Driver 201 is connected to terminals A and E; switch driver 202 is connected to terminal B; switch driver 203 is connected to terminal C; and switch driver 204 is connected to terminal D of selector 71. Referring to switch driver 201, for details of the switch drivers it has provided therein one NPN transistor 206 and one PNP transistor 211. The emitter of transistor 206 is connected to a −25 volt source, and the collector is connected to a +15 volt source through a resistor 207. The end of the resistor remote from the 15 volt source is connected to terminals A and E. The control electrode or base of transistor 206 is connected through a resistor 210 to the collector of transistor 211. The control electrode or base of transistor 211 is connected to signal group and the emitter thereof is connected through a resistor 213 and a manually operable altitude rate mode engage switch 214 to a positive source of DC voltage. Thus, upon closing switch 214 transistor 211 becomes conducting and applies a current to the control electrode of transistor 206, thus causing transistor 206 to be conducting and lowering the voltage of terminals A and E. However, with the switch 214 open a positive voltage appears at terminals A and E.

The switch drivers 202, 203, and 204 are similarly controlled. In other words, with their transistors corresponding to transistor 206 conducting the voltage at terminals B, C, D, decrease. When their control switches are open, their respective terminals assume a positive 15 DC voltage thereby enabling field effect transistors 135, 141, 151, 157 to be conducting.

The logic arrangement 200 includes additionally eight standard integrated logic circuits, such as the SN5400 series of the Texas Instruments Company. In general, these standard integrated circuits function as NAND logic devices, and in other instances merely as inverters. Thus, if any input to a NAND device is minus or zero, the output of such NAND device is plus or positive.

Included in the logic device 200 is an altitude engaged fader arrangement 215 energized from an altitude mode engage switch 219 to transmit a positive DC voltage thereto. The altitude mode engage fader for gradually applying altitude control includes a time delay circuit 220 and a DC to pulsewidth modulator 221 (both old devices) all whereby a steady positive DC voltage is transformed to pulsewidth output of gradually increasing widths that are supplied to output resistor 222. The output resistor 222 is directly connected through conductor 223 to the switch driven 202. Thus drivers 201, 202 are directly controlled by switches 214, 219. The remaining switch drivers 203 and 204 are controlled through switches 214, 219 by NAND devices. Overall in FIG. 3 with respect to the standard integrated circuits, integrated circuits 224, 226, and 241 function as inverters, that is for a plus input there is a minus output. Also the integrated circuits 225, 229, 230, 231, and 242 function as NAND gates, and as stated if any input is minus or zero, the output of the NAND gate is plus or positive; if both inputs are positive, the output is minus or negative. There are three control voltages, that from switch 214, that from switch 219 and that on conductor 237 from the altitude rate reference 47 FIG. 2, that determine the output of the terminals A, B, C, D, and E. The output at these terminals may be determined by referring to the table in FIG. 4 which lists configurations 1–5. Referring to condition or configuration 4 in the table, where according to the tabulations the altitude mode engage switch 219 is closed, the altitude rate mode engage switch 214 is closed, and the altitude rate reference polarity signal on conductor 237 is positive thereby commanding an upward climb of the craft. Under the above conditions, the closing of the altitude rate mode engage switch 214 transmits a plus or positive DC voltage to the driver 201 FIG. 3 resulting in transistor 206 being conducting consequently, terminals A and E which are controlled by transistor 206 are negative or minus 25 and field effect transistor 135 and transistor 190 are off. Also the closing of switch 219 results in a positive input to the altitude engage fader 215, and the resulting positive pulse ouptuts of gradually increasing width or time duration are in one case applied to switch driver 202 resulting in its being conductive and applying at each positive pulse a —25 polarity signal to terminal B so that transistor 157 FIG. 2 is intermittently off. The altitude rate mode engage switch 214 controls the inverter 224 so that its output is negative and is applied to NAND device 229. A positive pulse output from the altitude engage fader 215 is applied to an inverter 226 so that its output is negative, and it is applied to NAND device 229. Consequently, the output of NAND device 229 is positive and such output is applied to NAND devices 230 and 231.

The altitude rate reference voltage on conductor 237 is positive for commanded ascent and is applied to NAND device 242 and if the altitude rate reference be positive, and the two other inputs to NAND device positive, the NAND device 242 has a negative output that is applied through NAN device 231 to switch driver 204. The output of switch driver 204 is less positive and D is —25.

The positive voltage on conductor 237 is also applied to inverter 241 which thus has a negative output that is applied to NAND gate 225. NAND gate 225 also receives two positive outputs so that the output therefrom to NAND gate 230 is positive, but because of the two positive inputs thereto, the output of NAND device 230 is negative. This negative output is applied to switch driver 203 causing it to become nonconductive so that terminal C is +15.

The effect of the polarity of the voltages on terminals A, B, C, D, and E on the operation of the signal select switching arrangement 71 of FIG. 2 may now be considered. We note from FIG. 2 that when the inputs on conductors 107 and 130 to amplifiers 134 and 156 respectively are positive, either of such positive signals command nose down to the aircraft. In other words, the altitude rate error and the altitude error are both positive and command nose down to the aircraft through the servomotor 10 that operates a control surface resulting in the nose of the craft being depressed. With respect to the field effect transistors 135, 141, 151 and 157 in FIG. 2 if, for example, a positive voltage appears at terminal A its associated diode 136 is back biased. Consequently, transistor 135 is conducting or is "turned-on" to permit the output of amplifier 134 to be fed back to its input resulting in no effective output to control servo 10. On the other hand, if a negative polarity signal is applied to terminal A, the transistor 135 is not conducting and amplifier 134 has an effective output to control servo 10. In a similar manner the transistors associated with terminals B, C, and D may be similarly turned on to permit conduction therethrough. Also, a negative polarity at the corresponding terminals will turn these transistors off, and no conduction therethrough occurs.

Similarly, a positive voltage at terminal E will cause transistors 104 and 190 in FIG. 2 to become conducting. When transistor 190 becomes conducting the limiter is in effect with respect to limiter 59 FIG. 2. With transistor 104 turned on from the positive signal on terminal E, the signal inputs to lag device 105 are held at zero. The opposite is true when the voltage at terminal E is negative as in the present instance with respect to configuration or condition 4 FIG. 4. In other words, when the altitude rate engage switch 214 is closed, limiter 59 does not effect a limiting action, and inputs are allowed to enter 105. Consequently, the altitude rate error and the altitude error respectively on conductors 101 and 116 are supplied directly to amplifiers 106 and 120.

A better understanding of what follows with respect to the signal select switching arrangement 71 may be had by review of a prior patent of Rotier 3,204,118, issued Aug. 31, 1965, Rotier being one of the inventors herein. For purpose of discussion, FIG. 2 of the patent is considered and in FIG. 2 thereof terminals 10 and 20 correspond with terminals 144 and 146 in the signal select switching arrangement 71 herein. In the patent, FIG. 2, it is desired to select between two signals $e_n$ and $e_1$ at terminal 10. Also at terminal 20 it is desired to select between signals $e_1$ and $e_p$. At terminal 10 there will be supplied the less negative of the two signals $e_n$ and $e_1$ whereas at terminal 20 there will be provided the less positive of signals $e_1$ and $e_p$.

Under configuration four the table of FIG. 4 herein, the field effect transistor 151 associated with terminal C is conducting whereas the other field effect transistors for this configuration are not conducting. Thus, both amplifiers 134 and 156 in arrangement 71 herein will provide an output. The outputs of these amplifiers are the two signals that are to be compared and one is to be selected to control servo 10. Since the transistor 151 is conducting the portion of arrangement 71 FIG. 2 herein effective at this time conforms with the portion of FIG. 2 of the patent including source 13 and 25 along with the output point 20 and voltage source 22 so that at terminal 20 in the patent the least positive of voltages $e_1$ and $e_p$ is selected to provide the output. Consequently, in FIG. 2 herein in selector 71 the output is provided at terminal 144. In other words, when the polarity of the rate of climb reference on conductor 237 is positive, and with both signals applied to amplifier 134 and 156 positive, the output for controlling the servo is the least positive to the two signals out of amplifiers 134, 156.

Reverting to the logic arrangement 200 of FIG. 3, the output of the altitude engage fader 215 at resistor 222 is in the form of positive pulses. Following closing of the altitude engage switch 219, the output DC at resistor 222 to the left of arrangement 215 is momentarily negative and due to actuation of the DC to pulsewidth modulator 221 the output swings to a narrow positive pulsewidth and returns to a negative output pulse, with the operation being such that whereas the positive output pulses begin with a narrow pulsewidth and gradually increase to a continuous DC output, the negative pulses begin with a broad pulsewidth and gradually decrease to a narrower pulsewidth until there is no negative output. It can therefore be seen that the switch driver 202 is operated in accordance with the positive DC pulses and ultimately is continuously energized.

The time delay device 220 and the DC to pulsewidth modulator 221 are provided with inverting and noninverting input terminals so that when a signal is applied to an inverting terminal the output is of opposite phase thereof. Consequently, as connected as shown, the output at resistor 222 is of the same polarity as the input provided through the altitude engage switch 219. Thus, after a period of time upon closing of the altitude engage switch, there is a continuous DC output from the modulator 221.

Summarizing, concerning elements of the logic device 200 in FIG. 3 such as integrated circuits 229 or 225, if any of the inputs thereto is minus or zero the output therefrom is positive or plus. Even when functioning as an inverter as device 224, if the input thereto is zero, the output is plus.

The selected altitude rate voltage applied to conductor 237 is a DC voltage of positive or negative polarity depending upon whether the altitude rate selected is for an ascent or for a descent.

The switch drivers 202, 203, 204 being controlled through fader 215 are momentarily intermittently operated when switches 214 and 219 are closed.

If terminal A be minus 25, amplifier 134 has an effective output; however, if terminal A is positive 15, amplifier 134 has no effective output. Similarly when terminal B is negative or minus amplifier 156 has an output, and if terminal B be positive amplifier 156 has no effective output. If terminals A and B are both positive, neither amplifier 134, 159 is effective, and there is no altitude control.

In the signal select switching arrangement 71 herein, the signal at terminal 144 will be the lesser negative of the altitude rate error or the altitude error; at terminal 146 there will be the voltage corresponding with the lesser positive of the altitude error signal or the altitude rate error signal.

It may be helpful to the understanding of the operation of the switching device 71 to refer to the Rotier Pat. 3,204,118, FIGS. 2 and 3 in the sense that with transistor 151 herein conducting the operation is similar to that in the Rotier patent between the voltage sources 13 and 25. On the other hand, when the transistor 141 herein, is conducting, the operation is similar to that of FIG. 2 in the Rotier patent including voltage sources 13 and 15. In other words, with transistor 151 herein conducting, terminal 144 herein corresponds with terminal 20 FIG. 2 of the Rotier patent. Similarly, with transistor 141 conducting and transistor 151 not conducting terminal 146 herein corresponds with terminal 10 FIG. 2 of the Rotier patent. Thus, terminal 144 will transmit for control the more positive or less negative of the voltages applied to amplifiers 134 and 156. Alternatively, terminal 146 herein will transmit the least positive of the control signals applied to amplifiers 134 and 156.

Terminals 144 or 146 are alternatively controlling depending upon whether the altitude rate reference polarity on conductor 237 FIG. 4 is positive or negative as selected. Thus, if the altitude rate reference signal is positive calling for ascent, terminal 144 is controlling and the more positive control signals on amplifier 134 and 156 operate the control surface. Alternatively, with the selected altitude rate reference negative calling for a descent, terminal 146 of the signal select switching arrangement is controlling, and it transmits the least positive control signals applied to amplifiers 134 and 156 FIG. 2 herein.

It will be noted herein that terminal 144 FIG. 2 has a positive bias applied to it similar to point 20 FIG. 2 of the Rotier patent and also terminal 146 herein has a negative bias applied thereto similar to terminal 10 FIG. 2 of the Rotier patent. Thus, in one case, amplifiers 134 and 156 FIG. 2 herein correspond with voltage sources 13 and 25 and alternatively correspond with voltage sources 13 and 15 of the Rotier patent FIG. 2.

An analysis of the joint altitude rate control and the altitude hold control of FIGS. 2, 3, and 4 herein shows that when the altitude rate reference polarity is positive on conductor 237, and altitude rate engage switch 214 closed that since polarities of the two signals applied to NAND circuit 231 are positive its output is negative and driver 204 has a positive output, e.g. driver 204 is OFF, terminal D is plus 15 and its associated transistor 141 is ON.

On the other hand, if the altitude engage switch 219 is now also closed, the switch driver 202 is momentarily intermittently turned ON and OFF in accordance with the output from fader 215 to resistor 222. Since the output of integrated circuit 229 is pulsing positive and with the altitude rate reference positive, the output of device 225 positive, the output of integrated circuit 230 is negative so that switch driver 203 is not turned ON. Consequently, with terminal C positive, transistor 151 is turned ON.

When the output of fader 215 is continuously positive, switch driver 202 is operated, and terminal B is negative so that amplifier 156 has an effective output. At this time, the output on terminal 144 is the more positive or less negative of the signals applied to amplifier 134 and 156 or by the inverting action of amplifiers 134, 156, terminal 144 has the more negative of the outputs of amplifiers 134, 156 so that even if the altitude error (the difference between the present altitude and the desired altitude) is large, the altitude rate error will control being the more positive or less negative. Thus, the altitude rate error may control during the ascent both during the time that the output of the fader 215 is alternately positive and negative. When the output of the fader 215 is continuously positive, terminal B is negative and amplifier 156 will have a continuous output as long as there is a barometric error signal applied thereto. Thus, as the aircraft existing lower altitude approaches the desired higher altitude and the barometric altitude error decreases, the altitude error signal on conductor 130 will control if it is less negative with respect to the altitude rate error on conductor 107. By means of this switching arrangement 71, therefore, the craft is automatically controlled while ascending from the greater of the two positive signals on conductors 107, 130 and attains its desired altitude predetermined by selector 71 with substantially no overshoot.

It will also be now evident upon analysis that when a descent is to be effected, configuration 5, at which time the desired or selected altitude rate voltage will be negative on conductor 237, that switch driver 204 will not be energized since device 231 has a negative output, terminal D will be positive and its related transistor 141 will be conditioned for conducting. On the other hand, switch driver 203 will be energized since device 230 has a positive output so that terminal C is negative and its related transistor 151 is nonconducting. With the altitude rate engage switch 214 already closed, and the craft descending at a selected altitude rate, the altitude engage switch 219 may be thereafter engaged for control to an altitude selected by adjustment of knob 41, FIG. 2. Again, the output of the altitude engage fader 215 is alternative positive and negative. Thus, terminal B, since its switch driver is alternately operated, has voltages alternately positive and negative. Thus, again the amplifier 156 is rendered effective or ineffective in accordance with the operation of transistor 157. It is evident that the altitude error is now positive since the aircraft is descending and the desired craft altitude is less than the existing craft altitude. The least positive of the two signals on amplifiers 134 and 156 or least negative of the outputs of these amplifiers is selected automatically to control the craft's servo 10 in the automatic pilot that operates the elevator surface. Consequently, the aircraft will be controlled to follow the desired rate of descent selected. Thus, in the No. 5 configuration of the table in FIG. 4 the altitude error is positive since the existing altitude is above the desired or selected altitude; the altitude rate error is plus or positive if the rate of descent is greater than the rate of descent reference. If the craft rate of descent be less than the selected rate of descent reference the altitude rate error is negative. Thus, terminal 146 of the signal selector 71 (that corresponds with terminal 10 of Rotier 3,204,118) transmits the least positive of the two amplifier control signals, altitude error or altitude rate error. Consequently, the path of the craft is controlled from the altitude rate error initially, since the altitude error signal being large and positive it will not be transmitted to control the craft on the initial portion of the flight. However, as the altitude error decreases during the altitude rate descents, it may have a positive value smaller than the positive altitude rate error, and it will be transmitted to cause a decrease in the rate of descent.

Reverting to FIG. 2 of the Rotier Pat. 3,204,118 with respect to the signal selector 71 of FIG. 2 herein, the voltage sources 13, 15 and 25 of the patent correspond with the amplifiers 134, 156 in that the amplifiers effect an inversion of the altitude error and altitude rate error signals applied thereto, consequently, while terminal 146 herein corresponds with terminal 10 of the patent and terminal 144 herein corresponds with terminal 20 of the patent, due to the inversion of the control signals by amplifiers 134 and 156, terminal 144 transmits the least negative of the control signals or the most positive of the control signals applied to amplifier 134, and likewise terminal 146 transmits the least positive or most negative of the signals applied to amplifier 156.

From the above discussion of configurations 4 and 5 of the table of FIG. 4, it will be evident how the control operates for configurations 1–3.

OPERATION

It is assumed that the conventional autopilot which includes attitude and rate sensors operates through the servo means for controlling the aircraft. If it be desired at this time to introduce an outer loop control such as altitude rate control, altitude hold control, or both altitude and altitude rate control the particular form of control and the operable switches are as represented in the table in FIG. 4. In other words, the pilot may select the desired altitude rate and/or desired altitude and he may thereafter operate the altitude rate engage switch 214 and/or the altitude engage switch 219. In accordance with the particular mode selected, namely, altitude rate, altitude hold or joint altitude rate and altitude hold, the signal selector 71 will transmit a signal in accordance with the mode selector, through the automatic pilot, to control the servo means that controls the position of the craft about its pitch axis. The aircraft while on a selected altitude rate mode will be automatically controlled to depart from the altitude rate mode to the altitude hold mode so that the aircraft is maintained on a preselected altitude.

It will now be apparent that there has been provided an altitude control for a dirigible craft wherein the altitude mode can be used simultaneously with the altitude rate mode to permit selection of a maximum altitude rate desired during a climb or descent to a selected altitude. If both modes (altitude rate and altitude hold) are engaged simultaneously, a novel signal selector is activated which selected from the rate error or altitude error the most nose down signal for controlling of the craft, if the selected rate is a climb signal; and alternatively the signal selector will select the most craft nose-up signal or least down signal if the selected rate is a descent signal. This results in a smooth transition between control modes as the altitude rate error and altitude error signals become equal.

The invention described and claimed herein resulted from work done under United States Government contract FA–SS–66–7; the United States Government has an irrevocable, non-exclusive license under this application to practice and have practiced the invention claimed herein, including the unlimited right to sublicense others to practice and have practiced the claimed invention.

What is claimed is:

1. In apparatus for controlling a condition of a craft such as position and having condition changing means, first means providing a displacement error control signal determined by the difference and by the direction between a present and a desired condition, second means providing a rate control signal determined by the error between the actual and desired magnitude and direction of a rate of change of the condition, signal selective means operated in accordance with the direction of the selected rate of change of the condition, and further means controlling operation of said condition changing means and alternatively connected by the selective means to the first or second control signal providing means, but initially connected to the second control signal providing means so that when the desired condition such as position is nearly attained, if the rate of change in the condition error signal is of the same direction as the displacement error signal calling for further change in the condition to attain the desired condition, the condition changing means of the apparatus is connected by the selective means to respond to the output from the first means, if the displacement signal is less than the rate signal.

2. The apparatus of claim 1 above, and a limiter provided between the first error signal producing means and the further means to limit the rate of change of the condition.

3. The apparatus of claim 1, with the selective means selectively controlling said further means from the lesser of the two signals from said first means and from said second means.

4. The apparatus of claim 3 including means for "fading-in" or gradually increasing the control of the apparatus by the first signal providing means while said apparatus is initially being controlled by the second signal providing means.

5. The apparatus of claim 4 wherein the signal selective means for controlling the further means from the second or first means includes means for alternatively controlling said further means by said second or first means during the "fading-in."

6. The apparatus of claim 5, wherein the apparatus controls altitude of a craft and the further means through the selective means is controlled both by the sensed altitude and selected altitude or by the actual and selected rate of change of altitude and effecting the control of the apparatus only by the first means or altitude displacement error, if the signal therefrom is in the same direction as the altitude rate error signal and is in excess of.

7. In automatic control apparatus for an aircraft for changing position thereof, first means providing an error signal in accordance with the difference between a present and desired position of the craft, second means providing a signal in accordance with the rate of change in position of the craft, third means in said second means providing a signal in accordance with a selected rate of change in position of the craft, and means controlled by the third means and connected to the first means and to the second means and alternatively, isolating from a control of the apparatus the signal from the first means or that from the second means.

8. The apparatus of claim 7, wherein the last named means includes signal selective switching means and position stabilizing and rate stabilizing mode selection means for controlling the apparatus from either the first or second named means.

9. The apparatus of claim 7 wherein the last named means includes switching means, whereby when the desired position is nearly attained, if the change in the position signal and the difference between the desired rate and actual rate of change of position signal is also in the same direction, the apparatus is connected to respond to the lesser of the two signals.

10. The apparatus of claim 8, wherein the mode selection means includes time delay means for "fading-in" the control by the first signal providing means while the apparatus is in control by the second signal providing means.

11. In aircraft condition control apparatus initially operating in one mode, control signal selecting means comprising:
 a first apparatus operating mode selector;
 a second apparatus operating mode selector;
 a logic means controlled jointly by said two mode selectors, a selective signal transmitting means preset by said logic means; and
 sensing means for supplying to said transmitting means two signals, in accordance with the two operating modes, whereby the selective signal transmitting means compares and transmits alternatively the one of the two signals supplied thereto which is the lesser, for control of the apparatus.

12. In aircraft automatic position control apparatus, operating initially in a rate of change of position mode in one of two directions, means for selecting a signal for subsequent control of the apparatus comprising:
 a first apparatus position stabilizing operating mode selector;
 a second apparatus position rate stabilizing operating mode selector;

a logic means jointly controlled by said two mode selectors;

a signal selecting means preset by said logic means;

two sensing means for supplying to said signal selecting means two signals corresponding with the two operating modes, whereby the signal selecting means transmits alternately the one of the two signals supplied thereto tending the more to reduce the rate of change of position.

13. The apparatus of claim 12, wherein the first mode selector is operated subsequent to operation of the second mode selector.

14. The apparatus of claim 12, wherein the position and rate of change in position involved are the altitude and rate of change in altitude and the first and second mode selectors relate to altitude stabilizing and altitude rate stabilizing whereby the signal selected of the altitude rate error and altitude error following initial operation is that one commanding the more down depression of the nose of this craft if the rate of change of altitude that determined the direction of rate of change in altitude commanded a climb but selected the signal commanding the more elevation of the nose of the craft if the selected rate initially commanded a descent of the craft.

15. In control apparatus for an aircraft having an automatic pilot operable means including a servomotor for controlling craft position:

means for supplying a first displacement error control signal for controlling the position of an aircraft;

means for supplying a second rate error control signal for controlling the position of said aircraft; and further means for selecting initially and transmitting to said servomotor the rate error signal if the displacement signal be larger and of the same polarity as the rate signal.

References Cited

UNITED STATES PATENTS

| | | | |
|---|---|---|---|
| 2,875,965 | 3/1959 | Anderson et al. | 244—77 |
| 3,089,671 | 5/1963 | Treffeisen | 244—77 |
| 3,291,421 | 12/1966 | Kramer et al. | 244—77 |

FERGUS S. MIDDLETON, Primary Examiner

U.S. Cl. X.R.

318—489